United States Patent [19]

Shubert

[11] Patent Number: 4,689,463

[45] Date of Patent: Aug. 25, 1987

[54] WELDING APPARATUS METHOD FOR DEPOSITING WEAR SURFACING MATERIAL AND A SUBSTRATE HAVING A WELD BEAD THEREON

[75] Inventor: Gary C. Shubert, Tinton Falls, N.J.

[73] Assignee: Metallurgical Industries, Inc., Tinton Falls, N.J.

[21] Appl. No.: 810,876

[22] Filed: Dec. 18, 1985

Related U.S. Application Data

[62] Division of Ser. No. 700,972, Feb. 12, 1985, abandoned.

[51] Int. Cl.$^4$ .................................................. B23K 9/00
[52] U.S. Cl. ......................... 219/76.16; 219/121 PL; 219/121 P; 219/121 PW; 427/34
[58] Field of Search ............... 219/121 PY, 121 PA, 219/121 PB, 121 PL, 121 PT, 76.16, 121 PW, 75, 137 R, 76.14, 76.15; 427/34

[56] References Cited

U.S. PATENT DOCUMENTS

| 3,274,371 | 9/1966 | Manz et al. ....................... 219/76.14 |
| 3,519,780 | 7/1970 | Potapievsky et al. ........... 219/76.14 |
| 3,803,380 | 4/1974 | Ragaller ....................... 219/121 PL |
| 4,142,089 | 2/1979 | Lau et al. ..................... 219/121 PL |

FOREIGN PATENT DOCUMENTS

| 0206572 | 12/1982 | Japan ................................. 219/76.16 |
| 0212868 | 12/1983 | Japan ............................ 219/121 PL |

*Primary Examiner*—M. H. Paschall
*Attorney, Agent, or Firm*—Kenyon & Kenyon

[57] ABSTRACT

The welding method may be used to lay down weld beads on metallic substrates with a narrow width of 0.125 inch and less. The process employs a plasma transferred arc and pulses the current delivered to the arc such that a wave form having at least a main amplitude and a lower auxiliary amplitude is provided. The powdered metal which is delivered is laid down in a series of overlapping weld deposits which solidify very rapidly and produce a fine grain structure.

16 Claims, 3 Drawing Figures

WELDING APPARATUS METHOD FOR DEPOSITING WEAR SURFACING MATERIAL AND A SUBSTRATE HAVING A WELD BEAD THEREON

This is a division of application Ser. No. 700,972, filed Feb. 12, 1985, now abandoned.

This invention relates to a welding apparatus and method for depositing a wear surfacing material on a metallic substrate. More particularly, this invention relates to a method and apparatus for depositing a weld bead deposit on a narrow surface of a metallic substrate.

Heretofore, various types of welding techniques have been known for applying wear surfacing material onto a metallic substrate. For example, U.S. Pat. Nos. 3,803,380 and 4,122,327 describe techinques of using a plasma-flame burner for depositing a flow of powdered metal onto a substrate. Further, in some cases, such as described in U.S. Pat. No. 4,142,089, it has been known to use a pulsed mode of arc heating in a plasma gun sprayer for applying a coating of powdered material onto a substrate. In still other cases, for example as described in U.S. Pat. No. 3,781,508 it has been known to use a pulsed weld current with a transferred arc in order to form a coating from a consumable electrode.

It has also been known from U.S. Pat. Nos. 4,125,754 and 4,472,619 to form a hard surface on a substrate using a plasma transferred arc. In these cases, melting and fusion of an overlay material has been accomplished by providing a relatively constant electric current to the substrate in order to create a molten zone or puddle into which the overlay powder could be introduced. The powder, or at least one component of the powder, would then become molten and an integral part of the molten zone, adding to the volume of the previously established puddle. The heat source would continually move across the substrate and this process would be conducted continually until a weld of the desired length was achieved. Typical weld current variations, however, are limited to a gradual increase of the weld current at the beginning of the weld from some start level to the main welding level and thereafter a gradual reduction from the main welding level to some final level.

Of note, controlled arc welding techniques have also been known to use a pulsating arc current to form a deposit from an electrode such as described in U.S. Pat. Nos. 3,449,544; 3,521,027; 3,622,744; 3,666,906 and 3,683,149.

In the case of substrates or workpieces which have relatively narrow edges, it has been difficult to obtain a suitable bead deposit. For example, the deposits which have been obtained have generally had a thickness for a single pass in the range of from 0.020 inch to 0.250 inch and a width down to 0.0625 inch. Generally, the known processes have been unable to deposit upon substrate widths of 0.100 inch and less without significant melting of the substrate or the use of elaborate chilling devices. With deposit widths of less than 0.125 inch, a ratio of substrate width to a deposit width of 2.5 to 1 is typically maintained in order to provide a suitable base for the hardfacing material and a satisfactory heat sink to prevent the hardfacing material from excessively mixing or diluting with the substrate material and from spilling off the edges. In this regard, the deposit widths of less than 0.075 inch are considered unsuitable for these processes.

Accordingly, it is an object of the invention to obtain a very precise control over the bead deposit geometry of a deposited weld bead.

It is another object of the invention to lay down a bead deposit on a substrate having a narrow width.

It is another object of the invention to lay down a bead deposit on a substrate with a minimum of dilution of the substrate.

It is another object of the invention to provide a substrate with a bead deposit having a large height to width ratio.

It is another object of the invention to provide a process of forming a weld bead on a substrate material which is accompanied with reduced melting and flow of the substrate material.

It is another object of the invention to establish a method whereby overlay deposits may be applied to substrates of narrow widths using powdered metals and alloys, refractory hard carbides or the like, or mixtures of these as overlay materials.

It is another object of the invention to provide a method whereby overlay deposits on narrow section substrates can be built up to provide a large height to width ratio deposit.

Briefly, the invention provides a welding apparatus and method for depositing wear surfacing material on a metallic substrate, and particularly on very narrow surfaces of a substrate by use of a plasma transferred arc technique coupled with pulsing of the transferred arc to lay down powder metal into a bead deposit.

The apparatus includes a welding torch, a non-consumable electrode, a pilot arc welding power source, a main arc power source and a pulse control device.

The welding torch is constructed with a central passage for receiving the non-consumable electrode and a flow of inert gas, a second passage concentric to and about the central passage for receiving a flow of powdered metal and a third passage concentric to and about the second passage for receiving a flow of shielding gas.

The pilot arc welding power source is connected to and between the electrode and the torch in order to establish an electric arc therebetween. The main arc power source is connected to and between the electrode and the substrate to establish an electric arc therebetween as well as a plasma plume of the flow of inert gas between the electrode and the substrate.

The pulse control device is connected to the main arc power source for pulsing the power source in order to control the amplitude and duration of the power supplied from the main arc power source. The control device serves to pulse the current between a main current level and a lower auxiliary current level on a periodic basis. The main current level or amplitude is provided to create a weld puddle on the substrate and to fuse the powdered metal. The auxiliary current level or amplitude is provided to allow the previously created puddle to solidify thus creating a series of overlapping weld deposits. Variations in the current amplitude as well as the amplitude duration provide a very precise control over the weld deposit geometry and reduced heat input to the base material. This permits the creation of usable hardfacing deposits on substrates with narrow section widths.

The method provided by the invention comprises the steps of establishing a transferred arc between a non-consumable electrode and a narrow surface of a workpiece, forming a plasma plume of inert gas in the arc, feeding a flow of powdered metal into the plasma plume while moving the electrode along the workpiece for depositing the powdered metal along the narrow surface of the workpiece and pulsing the welding current to the electrode and workpiece between a main current level and a lower auxiliary current level during movement of the electrode in order to effect a series of overlapping weld deposits along the narrow surface of the workpiece.

The bead deposit which is formed by the overlapping deposits may have a thickness of from 0.010 inch to 0.125 inch for a single pass as well as a width of from 0.020 inch to 0.125 inch. Further, the ratio of bead height to bead width may be in the range of from 0.5:1 to 2:1 for a single pass. Still further, the ratio of substrate width to deposit width may vary from 0.5 to 1.0.

The invention also provides a metallic substrate having a narrow surface and a weld bead deposit on the narrow surface which is characterized in that the bead is formed of a series of overlapping weld deposits.

With pulsed arc welding currents, the molten zone formed on the substrate is constantly being created, growing in size, shrinking in size and solidifying completely. By adding overlay material at the appropriate time, the major portion of the heat input supplied by the welding torch can be utilized to melt the powder and only minimum amounts of this heat are directed into the substrate material. This reduces melting and flow of the substrate material.

On deposits where multiple layers are required, the previous overlay becomes the substrate. Minimum melting of the substrate occurs and the overlay material can be built up layer by layer to the desired height.

An added benefit of this technique is that due to the very efficient use of welding heat input, the weld deposits solidify very rapidly. Also, finer grain structures have been observed in many evaluated alloys utliizing this technique than in these alloys deposited using typical PTA methods.

These and other objects and advantages of the invention will become more apparent from the detailed description taken in conjunction with the accompanying drawings wherein.

Figure 1:
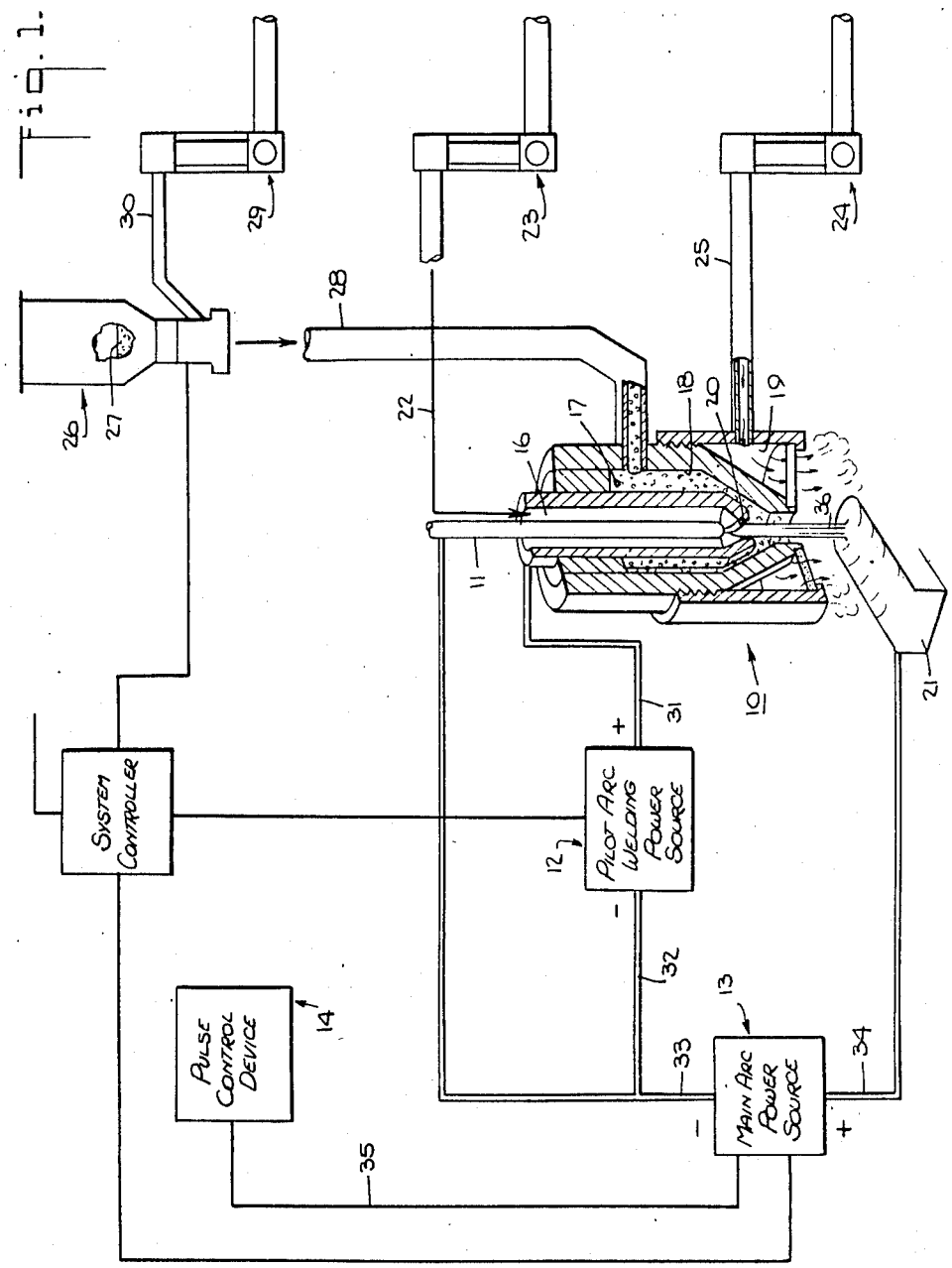
FIG. 1 illustrates a schematic view of a welding apparatus in accordance with the invention.

Referring to FIG. 1, the welding apparatus includes a torch 10, a non-consumable electrode 11, a pilot arc welding power source 12, a main arc power source 13, a pulse control device 14 and a system controller 15.

The torch 10 is of generally conventional construction and includes a first central passage 16 for receiving the electrode 11, a second passage 17 concentric to and about the first passage 16 for receiving a flow of powdered metal 18 and a third passage 19 concentric to and about the second passage for receiving a flow of shielding gas. In addition, the torch 10 has a restricting orifice 20 at the end of the central chamber 16 through which a flow of inert gas is directed towards a workpiece or substrate 21.

As indicated in FIG. 1, a gas line 22 is connected to the central chamber 16 of the torch in order to deliver an inert gas, such as argon, thereto. The gas line 22 is, in turn, connected to a gas flow control and metering device 23 which has an inlet gas line connected to a suitable inert gas source (not shown). This device 23 serves to control and meter the amount of inert gas delivered into the central chamber 16 of the torch 10.

In like manner, a flow control and metering device 24 is connected via a gas line 25 to the outer chamber 19 of the torch 10 in order to deliver a shielding gas, such as argon, thereto from a suitable shielding gas source (not shown).

Still further, a powdered metal delivery device 26 which contains a reservoir of powdered metal material 27 is connected via a supply line 28 to the chamber 17 of the torch 10 in order to supply powdered metal thereto. In addition, a flow control and metering device 29 is connected via a gas line 30 to the powdered metal delivery device 26 in order to convey an inert gas into the supply line 28 from a suitable source (not shown) in order to aid the conveyance of the powdered metal. The gas delivered to the delivery device 26 is used to assist gravity in transporting the powdered metal to and through the torch 10 while also protecting the powdered metal from atmospheric contamination. This gas also adds to the overall gas volume and composition at the weld zone.

The pilot arc welding power source 12 is connected to and between the electrode 11 and the restricting orifice 20 by suitable cables 31, 32, respectively, and internal connections (not shown) within the torch 10. The pilot arc welding power source 12 provides the welding current necessary to establish an electric arc between the electrode 11 and the restricting orifice 20. As indicated, the electrode 11 is connected to the negative terminal of the power source 12 while the restricting orifice 20 of the torch 10 is connected to the positive terminal of the power source 12.

The main arc power source 13 is connected to and between the electrode 11 and the substrate 21 in order to provide the welding current to establish an arc between the electrode 11 and the substrate 21. As indicated, the main arc power source 13 is connected to the electrode 11 and substrate 21 via suitable cables 33, 34, respectively. As indicated, the electrode is connected to the negative terminal of the power source 13 while the substrate 21 is connected to the positive terminal of the power source 13.

Figure 3:
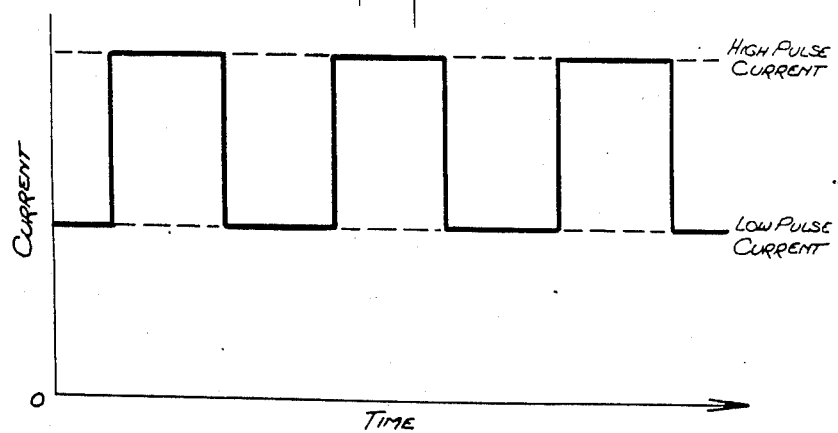
FIG. 3 illustrates a current verses time graph of a method in accordance with the invention.

The pulse control device 14 is connected to the main arc power source 13 via a suitable cable 35 in order to control the amplitude and duration of the power supplied from the main arc power source 13 to the electrode 11 and substrate 21. In this respect, the pulse control device 14 operates so that the current is delivered between a main current level as indicated in FIG. 3 and a lower auxiliary level with each over a programmed duration of time.

The system controller 15 is connected to the respective power sources 12, 13, the powdered metal delivery device 26 and the various flow control and metering devices 23, 24, 29 in order to synchronize the operation of these components.

In operation, with powdered metal material being supplied from the delivery device 26 to the torch 10 and with gas being directed to the passages 16, 19, the power sources 12, 13 are activated so that a transferred arc is established between the electrode 11 and substrate 21. At the same time, a plasma plume 36 of the inert gas supply through the passage 16 is formed between the electrode 11 and substrate 21. The delivered powdered metal is fed into this plume and transferred in molten form onto the substrate 21 to form a weld bead. The delivery of the powdered material is precisely metered by the device 26 while the gas delivered from the outer passage 19 shields th weld zone from atmospheric contamination while adding to the overall gas volume and composition at the weld zone. As the torch 10 and electrode 11 are moved along the length of the substrate 21, the pulse control device 14 is actuated via the controller 15 so that the welding current to the electrode 11 and substrate 21 is pulsed between the main current level and lower auxiliary level as indicated in FIG. 3. During the time of the higher main current level, a weld puddle is formed on the substrate and the consumable powdered material which is delivered into the puddle is fused in place. With the succeeding auxiliary current level occurring, the previously created puddle is allowed to solidify into a weld deposit. As the torch 10 and electrode 11 move along the substrate 21, a series of overlapping weld deposits occurs so that the resulting bead deposit is characterized in being formed of a series of overlapping weld deposits.

Figure 2:
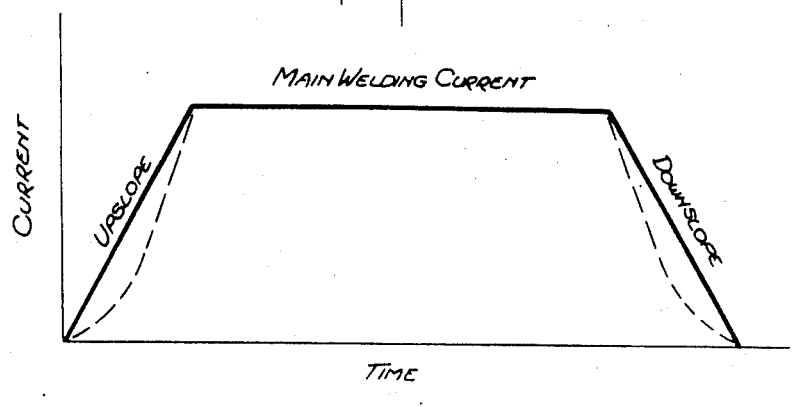
FIG. 2 illustrates a current verses time graph of a known welding technique.

Referring to FIG. 2, by way of comparison, previously known techniques for using a transferred arc to coat a substrate employed a substantially constant welding current so that a continuous bead of material was formed on the substrate. Typically, weld current variations were limited to a gradual increase of the weld current at the beginning of the weld from some start level to the main welding level and thereafter reduced from the main welding level to some final level as indicated.

The bead deposits which are obtained on the substrate can have very narrow widths. Further, the substrate onto which the bead is deposited may also have rather narrow widths. For example, the bead deposit thickness for a single pass may range from 0.010 inch to 0.125 inch with a width range of from 0.020 inch to 0.125 inch.

Of note, the welding method allows the depositing of the powdered metal material on very narrow widths of substrate without significant melting of substrate. Thus, elaborate chilling devices for the substrate are unnecessary particularly where the bead deposit width is of from 0.125 inch to 0.035 inch.

Typically, a ratio of substrate width to deposit width of from 1:1 is maintained. For deposits of a width of from 0.035 inch to 0.070 inch, the ratio may increase to 1:2. The height to width ratio of the weld deposit for a single pass can be precisely controlled, for example in ranges of from 0.5:1 to 2:1.

The invention thus provides a technique which can be used to deposit a wide variety of metals, metal alloys or mixtures of the metals and metal alloys along or with additions of refractory hard materials such as carbides. Of note, iron-, nickel- and cobalt-base alloys have been deposited. For example, these have included stainless steels, high chromium irons, tool steels, cobalt-chromium-tungsten alloys and nickel-chromium-silicon-boron alloys. In addition, mixtures of several of these materials with a carbide addition, e.g. tungsten carbide, titanium carbide and vanadium-tungsten carbide have also been deposited. This flexibility in material selection is a major characteristic of the pulse transferred arc technique that is not enjoyed by previously known processes that use other than powder consumables.

The invention further provides a technique by which very precise control over the hardfacing deposit bead geometry can be maintained.

Further, the invention provides a technique of forming a bead deposit on a substrate of rather narrow width with a minimum of dilution and with a minimum of heat.

The following table indicates various examples of typical welding parameters which were followed in laying down a bead on a metallic substrate.

TYPICAL WELDING PARAMETERS

Equipment: PSM-2 weld surfacing machine with a Hobart CYBER-TIG-300 AC/DC arc welder (power supply) with a 300 series programmer.

|  | Example 1 | Example 2 | Example 3 |
| --- | --- | --- | --- |
| Deposit Material | S-6 | M-2 | VWC in 430 stainless steel Matrix |
| Substrate Geometry | 0.062" wide edge | 0.50" diameter bar | 0.059" wide edge |
| Substrate Alloy | AISI 304 stainless steel | SAE 4130 (0.1875" wide deposit) | AISI 301 stainless steel |
| Current (amps) | 20 | 40 | 12 |
| Volts | 20 | 20 | 20 |
| Powder Feed Rate | 8.4 gm/min | 4.5 gm/min | 5.8 gm/min |
| Powder Mesh Size | 60/325 | 140/325 | 140/325 |
| Travel Speed | 8.3 in/min | 5.5 in/min | 7.8 in/min |
| Powder Gas Rate | 7 scfh* | 7 scfh | 7 scfh |
| Shield Gas | 50 scfh | 50 scfh | 50 scfh |
| Center Gas | 3 scfh | 3 scfh | 3 scfh |
| Programmer Drawer Settings (unless otherwise indicated): | | | |
| Hot Start | 0 | 0 | 0 |
| Upslope | 1 | 1 | 1 |
| Initial Current | ½ | ½ | ½ |
| Pulsation Start Delay | 0 | 0 | 0 |
| High Pulse Time (seconds) | 0.4 | 0.4 | 0.4 |
| Weld Current | 170 | 170 | 170 |
| % Weld Current | 0 | 0 | 0 |
| Low Pulse Time (seconds) | 1.2 | 1.2 | 1.2 |
| Down Slope Rate | 2 | 2 | 2 |
| Post Heat Time | 2 | 2 | 2 |
| Final Current | 0 | 0 | 0 |
| Weld Bead Configuration: | | | |
| Bead Height (Single Pass) | 0.025 in. | 0.025 in. | 0.031 in. |
| Height to Width Ratio (Single Pass) | 1 to 2 | 1 to 7 | 0.5 to 1 |

*scfh: standard cubic feet per hour.

Of note, a PSM-2 weld surfacing machine is a machine sold by Union Carbide Corp., Linde Division. In the above example, the CE501 standard power supply was replaced by a Hobart CT-300 AC/DC arc welder power supply as sold by Hobart Brothers Co. of Troy, Ohio. In addition, a 300 series programmer of this Hobart arc welder was used as the pulse control device.

The wearsurfacing materials tested have included:
S-6 (Co—Cr—W—C)
F-90 (Fe—Cr—C)
Metco 31-C (WC/Co+Ni base alloy)
GS 131 (W$_2$C+Ni base alloy)
N-50 (Ni—Cr—Si—B)
W-516 (W$_2$C+Co base alloy)
M-2 (Tool Steel)
WC/Co
(V,W)C Deposits were made on the following substrate materials
1020 Steel
Cast Iron
304 Stainless Steel
High Speed Steel 301 Stainless Steel
4130 Steel Of note, the current ranges could possibly vary from 1-2 amps for the low pulse current to several hundred amps for the high pulse current. The time could also vary from 0.1 seconds or less for the high pulse time to 3 or more seconds for the low pulse time. These adjustments to the welding conditions are the primary controls which allow the weld bead size and shape to be customized. In experiments to date, the amperage levels for low pulse currents have been from 4–15 amps and high pulse current from 20–70 amps. The high pulse and low pulse times being from 0.3–0.6 seconds and 1–1.4 seconds, respectively.

Further, the term "SCFH" is an acronym for Standard Cubic Feet per hour. The standard refers to a set of conditions for measurements which are: 70° F., 29.92" Hg atmos and the measured gas in a dry condition.

What is claimed is:

1. A method of forming a wear surface on a metallic workpiece, said method comprising the steps of
    establishing a transferred direct current electric arc between a non-consumable electrode and a narrow surface of a workpiece;
    forming a plasma plume of inert gas in the arc;
    feeding a flow of powdered metal into the plasma plume while moving the electrode along the workpiece for depositing the powdered metal along the narrow surface of the workpiece to form a weld deposit; and
    pulsing a welding current to the electrode and workpiece between a main current level and a lower non-zero auxiliary current level during movement of the electrode along the workpiece to effect a series of sequentially overlapping weld deposits along the narrow surface of the workpiece.

2. A method as set forth in claim 1 wherein the series of overlapping weld deposits form a bead deposit.

3. A method as set forth in claim 2 wherein the bead deposit has a thickness of from 0.010 inch to 0.125 inch for a single pass.

4. A method as set forth in claim 2 wherein the bead deposit has a width of from 0.020 inch to 0.125 inch.

5. A method as set forth in claim 2 wherein the bead deposit has a width relative to the width of the narrow surface of the workpiece of from 1:1 to 1:2.

6. A method as set forth in claim 2 wherein the bead deposit has a ratio of bead height to bead width of from 0.5:1 to 2:1 for a single pass.

7. A method as set forth in claim 1 wherein said main current level is in the range of from 20 to 70 amps and said auxiliary current level is in the range of from 4 to 15 amps.

8. A method as set forth in claim 7 wherein said main current level is pulsed for a time of from 0.3 to 0.6 seconds and said auxiliary current level is pulsed for a time of from 1 to 1.4 seconds.

9. A method as set forth in claim 1 wherein said auxiliary current level is 1 to 2 amps.

10. A method as set forth in claim 1 wherein said main current level is pulsed for a time of from 0.1 seconds or less and said auxiliary current level is pulsed for a time of from 3 or more seconds.

11. A method of forming an overlay on a narrow surface of a width not greater than 0.125 inch of a metallic workpiece, said method comprising the steps of
    establishing a transferred direct current electric arc between a non-consumable electrode and the narrow surface of the metal piecework;
    forming a plasma plume of inert gas in the arc;
    feeding a flow of powdered metal into the plasma plume while moving the electrode along the piecework for depositing the powdered metal along the narrow surface of the workpiece to form a weld deposit; and
    pulsing a welding current to the electrode and workpiece between a main current level and a lower non-zero auxiliary current level during movement of the electrode along the workpiece to effect a series of sequentially overlapping weld deposits along the narrow surface of the workpiece.

12. A method as set forth in claim 11 wherein said main current level is in the range of from 20 to 70 amps and said auxiliary current level is in the range of from 4 to 15 amps.

13. A method as set forth in claim 12 wherein said main current level is pulsed for a time of from 0.3 to 0.6 seconds and said auxiliary current level is pulsed for a time of from 1 to 1.4 seconds.

14. A method as set forth in claim 13 wherein the weld deposits form a bead deposit with a ratio of bead height to bead width of from 0.5:1 to 2:1 for a single pass.

15. A method as set forth in claim 11 wherein said auxiliary current level is about 1 to 2 amps.

16. A method as set forth in claim 11 wherein said auxiliary current level is pulsed for a time of from 3 or more seconds and said main current level is pulsed from 0.1 seconds or less.

* * * * *

UNITED STATES PATENT AND TRADEMARK OFFICE
CERTIFICATE OF CORRECTION

PATENT NO. : 4,689,463
DATED : August 25, 1987
INVENTOR(S) : Gary C. Shubert

It is certified that error appears in the above-identified patent and that said Letters Patent is hereby corrected as shown below:

```
Column 3, line 36 "utliizing" should be -utilizing-
Column 5, line 2 "th" should be -the-
Column 6, line 36 "Low Pulse Time (seconds) 1.2    1.2 should
   be "Low Pulse Time (seconds) 1.2      1.2      1.2-
Column 6, line 37 cancel "1.2"
Column 6, line 41 "0.025in    0.025in" should be
      -0.031in       0.025in     0.025in-
Column 6, line 42 cancel "0.031in"
Column 6, line 43 after "Width" insert  -Ratio (Single Pass)-
Column 6, line 45 cancel "Ratio (Single Pass)"
Column 8, line 20 "piecework;" should be -workpiece-
Column 8, lines 23, 24 "piecework" should be -workpiece-
Column 5, line 44, cancel "from"
Column 7, line 48, "1:2" should be --2:1 --.
```

Signed and Sealed this

Twenty-ninth Day of March, 1988

*Attest:*

DONALD J. QUIGG

*Attesting Officer*    *Commissioner of Patents and Trademarks*